US012578069B2

(12) United States Patent
Wang et al.

(10) Patent No.: US 12,578,069 B2
(45) Date of Patent: Mar. 17, 2026

(54) VEHICLE PROJECTION LENS AND VEHICLE LAMP

(71) Applicant: Young Optics Inc., Hsinchu Science Park (TW)

(72) Inventors: Kuo-Chuan Wang, Hsinchu Science Park (TW); Chen-An Chiang, Hsinchu Science Park (TW)

(73) Assignee: Young Optics Inc., Hsinchu Science Park (TW)

( * ) Notice: Subject to any disclaimer, the term of this patent is extended or adjusted under 35 U.S.C. 154(b) by 414 days.

(21) Appl. No.: 18/173,280

(22) Filed: Feb. 23, 2023

(65) Prior Publication Data

US 2023/0280009 A1 Sep. 7, 2023

(30) Foreign Application Priority Data

Mar. 1, 2022 (TW) .................................. 111107312

(51) Int. Cl.
*F21S 41/27* (2018.01)
*F21S 41/148* (2018.01)
*F21S 41/25* (2018.01)

(52) U.S. Cl.
CPC ............. *F21S 41/27* (2018.01); *F21S 41/148* (2018.01); *F21S 41/25* (2018.01)

(58) Field of Classification Search
CPC ........... F21S 41/27; F21S 41/148; F21S 41/25
See application file for complete search history.

(56) References Cited

U.S. PATENT DOCUMENTS

| | | | |
|---|---|---|---|
| 9,074,747 | B2 | 7/2015 | Abe |
| 10,753,563 | B2 | 8/2020 | Motohashi |
| 2020/0180504 | A1 | 6/2020 | Kim et al. |

FOREIGN PATENT DOCUMENTS

| | | | |
|---|---|---|---|
| CN | 104471310 | A | 3/2015 |
| CN | 105351839 | B | 2/2018 |
| TW | I546491 | B | 8/2016 |
| TW | I637125 | B | 10/2018 |
| TW | I717218 | B | 1/2021 |

OTHER PUBLICATIONS

TW_I717218, translation (Year: 2021).*

* cited by examiner

*Primary Examiner* — Wen Huang
(74) *Attorney, Agent, or Firm* — MUNCY, GEISSLER, OLDS & LOWE, P.C.

(57) ABSTRACT

A vehicle projection lens includes an aspheric first lens, a cemented lens consisting of a spherical second lens and a spherical third lens, and a spherical fourth lens in order from a magnified side to a minified side. An F-number of the vehicle projection lens is smaller than or equal to 0.86, a field of view of the vehicle projection lens is greater than 14 degrees and smaller than 44 degrees, and the vehicle projection lens consists essentially of four lenses respectively with positive, negative, positive and positive refractive powers.

19 Claims, 8 Drawing Sheets

VEHICLE PROJECTION LENS AND VEHICLE LAMP

BACKGROUND OF THE INVENTION a. Field of the Invention

The invention relates to a projection lens and, more particularly, to a vehicle projection lens used with a vehicle headlamp.

b. Description of the Related Art

The function of a vehicle headlamp is not only to allow a driver to recognize the state of the environment ahead, but also to allow surrounding people to know the driver's current location and thus provide a considerable degree of warning effects. Currently, there are smart vehicle headlamps on the market that can be automatically adjusted according to the ambient light and driving conditions to reduce the glare of oncoming cars, or the smart vehicle headlamps may project instruction images to assist driving. Therefore, it is desirable to provide a vehicle projection lens that may comply with government regulations specifying light pattern requirements and achieve good resolution and less distortion.

BRIEF SUMMARY OF THE INVENTION

According to one aspect of the present disclosure, a vehicle projection lens includes an aspheric first lens, a cemented lens consisting of a spherical second lens and a spherical third lens, and a spherical fourth lens in order from a magnified side to a minified side. An F-number of the vehicle projection lens is smaller than or equal to 0.86, a field of view of the vehicle projection lens is greater than 14 degrees and smaller than 44 degrees, and the vehicle projection lens consists essentially of four lenses respectively with positive, negative, positive and positive refractive powers.

According to another aspect of the present disclosure, a vehicle projection lens includes an aspheric first lens, a second lens having a negative refractive power, a third lens having a refractive power, and a fourth lens having a positive refractive power. The fourth lens is closest to a minified side of the vehicle projection lens among all lenses of the vehicle projection lens. An F-number of the vehicle projection lens is smaller than or equal to 0.86, a field of view of the vehicle projection lens is greater than 14 degrees and smaller than 44 degrees, the vehicle projection lens consists essentially of four lenses, and the first lens has a greatest diameter among all lenses of the vehicle projection lens.

According to another aspect of the present disclosure, a vehicle lamp includes a light source comprised of an LED array, a vehicle projection lens disposed downstream from and in a light path of the light source, and a vehicle lampshade disposed downstream from and in a light path of the vehicle projection lens. The vehicle projection lens has an F-number smaller than or equal to 0.86 and a field of view of greater than 14 degrees and smaller than 44 degrees. The vehicle projection lens includes an aspheric first lens, a second lens having a negative refractive power, a third lens having a refractive power, and a fourth lens having a positive refractive power.

In accordance with the above aspects, the vehicle projection lens and the vehicle lamp may comply with government regulations specifying safety requirements for vehicle lighting and may have high resolution, low distortion, miniaturized assembly, and can be used with vehicle headlight products to have reduced fabrication costs and good imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 11 is a modulation transfer function (MTF) diagram, and FIG. 12 illustrates percentage distortion curves for red, green and blue color lights.

FIG. 13 is a modulation transfer function (MTF) diagram, and FIG. 14 illustrates percentage distortion curves for red, green and blue color lights.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

The term "lens" refers to an element made from a partially or entirely light-transmissive material with optical power. The material commonly includes plastic or glass.

In an optical projection system, a magnified side may refer to one side of an optical path of an optical lens comparatively near a projected image (such as on a projection screen), and a minified side may refer to other side of the optical path comparatively near a light source or a light valve.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
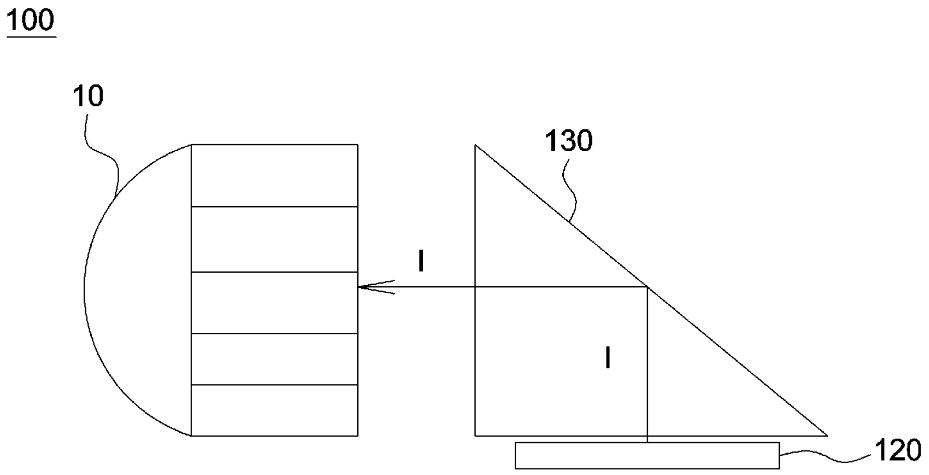
FIG. 1 is a schematic diagram of a vehicle lamp according to an embodiment of the invention.

FIG. 1 is a schematic diagram of a vehicle lamp according to an embodiment of the invention. Referring to FIG. 1, the vehicle lamp 100 in this embodiment includes an image source 120, a vehicle projection lens 10 and a lampshade (not shown). The image source 120 may include a light source may be a light emitting diode array (LED array), a micro LED array (u-LED), a laser or LEDs. In addition, in this embodiment, a prism 130 (or a reflective mirror) can be provided on the minified side of the vehicle projection lens 10, and an image beam I can be deflected by the prism 130 (or the reflective mirror) before entering the vehicle projection lens 10 to bend the optical path and thus reduce the overall space occupied by the vehicle lamp 100. In other embodiment, the image source 120 may be disposed on the minified side of the vehicle projection lens 10 and directly face the vehicle projection lens 10, and an image beam I from the image source 120 directly enters the vehicle projection lens 10.

Figure 2:
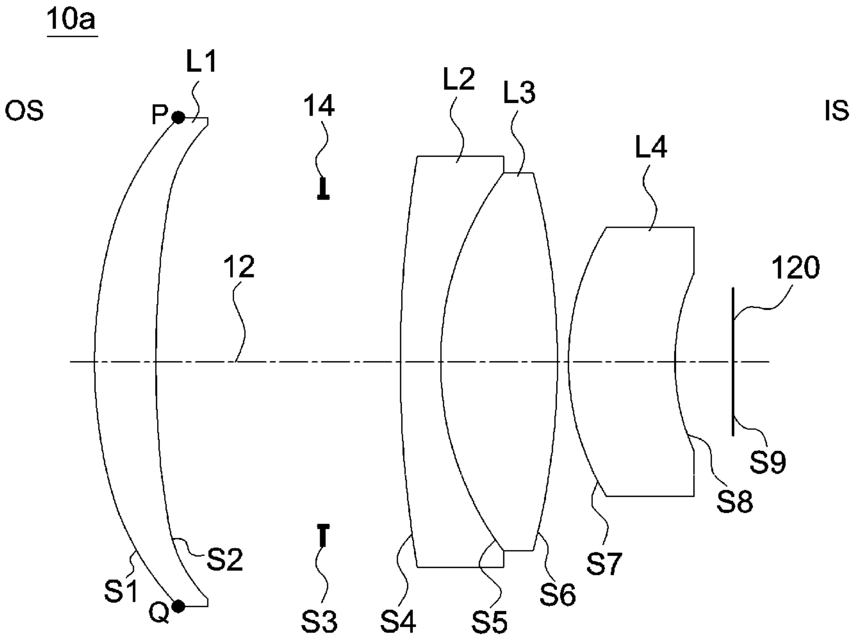
FIG. 2 shows a schematic cross-section of a vehicle projection lens in accordance with an embodiment of the invention.

FIG. 2 shows a schematic cross-section of a vehicle projection lens in accordance with an embodiment of the invention. Referring to FIG. 2, in this embodiment, a vehicle projection lens 10*a* is disposed between a magnified side OS and a minified side IS, the vehicle projection lens 10*a* has a lens barrel (not shown), and a lens L1, an aperture stop 14, a lens L2, a lens L3 and a lens L4 are arranged in order from the magnified side OS to the minified side IS inside the lens barrel. Besides, the image source 120 is disposed on the minified side IS.

In this embodiment, the vehicle projection lens 100 consists essentially of four lenses with refractive powers, and the refractive powers of the lens L1 to the lens L4 measured along the optical axis 12 are positive, negative, positive and positive, respectively. In this embodiment, the lens L1 is a plastic aspheric lens, the lens L2, the lens L3 and the lens L4 are glass spherical lens, and the lens L2 and the lens L3 together form a cemented lens. Further, a distance between outermost turning points of a lens at opposite ends of the optical axis 12 can be regarded as a maximum diameter of that lens. For example, as shown in FIG. 2, two opposite turning points P and Q on the magnified-side surface of the lens L1 are outermost turning points of the lens L1, and a connection line connecting the outermost turning points P and Q is a maximum diameter of the lens L1.

In each of the following embodiments, all lenses are not limited to have specific optical characteristic, shape and number and may vary according to actual demands. Besides, in each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop 14 may use a mechanic piece to block out peripheral light and transmit central light to achieve aperture effects. The mechanic piece may be adjusted by varying its position, shape or transmittance. In other embodiment, the aperture stop 14 may be formed by applying an opaque or a light-absorbing material on a lens surface except for a central area to block out peripheral light and transmits central light. Further, the larger the aperture of the aperture stop 14 is, the smaller the F-number of the vehicle projection lens 10*a* can be. In at least some embodiments of the invention, the aperture stop 14 can be disposed between the minified side and the lens closest to the magnified side.

A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis. Detailed optical data and design parameters of the vehicle projection lens 10*a* are shown in Table 1 below. Note the data provided below are not used for limiting the invention, and those skilled in the art may suitably modify parameters or settings of the following embodiment with reference of the invention without departing from the scope or spirit of the invention.

Table 1 lists the values of parameters for each lens of an optical system, where the surface symbol denoted by an asterisk is an aspherical surface, and a surface symbol without the denotation of an asterisk is a spherical surface. Besides, the radius of curvature, interval and diameter shown in Table 1 are all in a unit of mm.

TABLE 1

| Object description | Surface | Radius (mm) | Interval (mm) | Refractive index (Nd) | Abbe number (Vd) |
|---|---|---|---|---|---|
| lens L1(aspheric) | S1* | 43.79 | 7.32 | 1.4927 | 54.66 |
| | S2* | 159.77 | 20.25 | | |
| aperture stop 14 | S3 | INF | 9.07 | | |
| lens L2(meniscus) | S4 | 94.62 | 5.00 | 1.8467 | 23.79 |
| lens L3(bi-convex) | S5 | 25.81 | 14.00 | 1.7725 | 49.61 |
| | S6 | −51.76 | 0.25 | | |
| lens L4(meniscus | S7 | 19.29 | 13.00 | 1.7725 | 49.61 |
| | S8 | 16.71 | 6.90 | | |
| image source 120 | S9 | | | | |

In the above Table 1, the field heading "radius" represents a radius of curvature of a corresponding surface, and the field heading "interval" represents a distance between two adjacent surfaces along the optical axis 12 in the vehicle projection lens 10*a*. For example, an interval of the surface S1 is a distance between the surface S1 and the surface S2 along the optical axis 12, and an interval of the surface S8 is a distance between the surface S8 and the surface S9 along the optical axis 12. Further, the interval, refractive index and Abbe number of any lens listed in the column of "Object description" show values in a horizontal row aligned with the position of that lens. Moreover, in table 1, the surfaces S1 and S2 are respectively the magnified-side surface and minified-side surface of the lens L1, the surfaces S4 and S5 are respectively the magnified-side surface and minified-side surface of the lens L2, and the remaining lens surfaces are classified by analogy so that related descriptions are omitted for sake of brevity.

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table and shown in corresponding figures.

Figure 15:
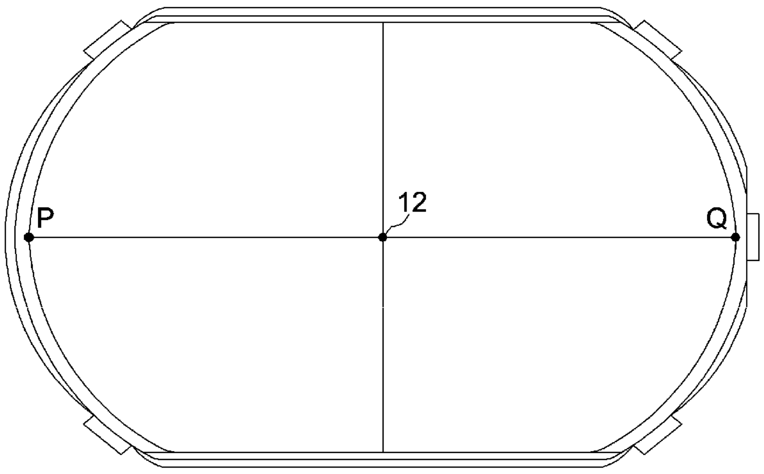
FIG. 15 shows a schematic diagram of an edge-trimmed plastic lens.

The symbol F/# stands for an F-number of the vehicle projection lens. In at least some embodiments, the F-number of the vehicle projection lens is within a range of 0.4 to 0.86, and an absolute value of distortion of the vehicle projection lens is less than 10%. In this embodiment, an F-number of the vehicle projection lens 10*a* is 0.683, and a maximum diameter of the plastic aspheric lens L1 is about 51.4 mm. In some applications for the embodiments of the invention, part of the plastic aspheric lens L1 is cut off, which is called edge trimming. However, a maximum diameter of a trimmed lens L1 is figured out still including the trimmed part, such that a maximum diameter of a trimmed lens L1 is equal to the length of a connecting line connecting the point P and point Q shown in FIG. 15 and is the same as the maximum diameter of the lens L1 that is not trimmed.

EFL denotes an effective focal length of the vehicle projection lens 10*a*. In this embodiment, the effective focal length EFL of the vehicle projection lens 10*a* is 30.9 mm, and |EFL/BFL|=4.48. BFL denotes a back focal length of the vehicle projection lens 10*a*. Specifically, Wikipedia's explanation of BFL is as follows, "For a thick lens (one which has a non-negligible thickness), or an imaging system consisting of several lenses or mirrors (e.g. a photographic lens or a telescope), the focal length is often called the effective focal length (EFL), to distinguish it from other commonly used parameters. . . . Back focal length (BFL) or back focal distance (BFD) is the distance from the vertex of the last optical surface of the system to the rear focal point." Therefore, the back focal length of the vehicle projection lens 10*a* is 6.9 mm corresponding to the interval of S8 shown in Table 1.

When the vehicle projection lens is used as a photographic lens, BFL is the distance from the vertex of the optical surface of the vehicle projection lens closest to the minified side to the rear image plane, under the premise that the object distance is set to infinity or zero-degree parallel light beams incident to the vehicle projection lens at the magnified side. In at least some embodiments, the vehicle projection lens satisfies the condition of |EFL/BFL|>3.8, preferably |EFL/BFL|>4.5, and more preferably |EFL/BFL|>5.05. Meeting this condition may avoid a considerably drop in image resolution under large aperture situation.

FOV stands for a light collection angle of an optical surface S1 closest to the magnified side OS; that is, the FOV is a full field of view measured by a horizontal diagonal line. In at least some embodiments, the full field of view FOV is greater than 14 degrees and smaller than 44 degrees, preferably greater than 16 degrees and smaller than 42 degrees, and more preferably greater than 18 degrees and smaller than 40 degrees. In this embodiment, the full field of view FOV of the vehicle projection lens 10*a* is 24 degrees.

In at least some embodiments, a total track length TTL of the vehicle projection lens, which is a distance of a vertex of the optical surface S1 closest to the magnified side and a rear image plane (image source 120) is smaller than 90 mm, preferably smaller than 80 mm. In at least some embodiments, an interval between the lens L1 and the lens L2 is within a range of 15 mm to 40 mm, and a ratio of an interval between the lens L1 and the lens L2 to the overall length OAL is within a range of 0.22 to 0.56, where the overall length OAL stands for a distance between a vertex of the optical surface S1 closest to the magnified side OS and a vertex of the optical surface S8 closest to the minified side IS of the vehicle projection lens 10*a* in this embodiment. In at least some embodiments, a ratio of a maximum diameter of the lens L1 closest to the magnified side to the overall length OAL is within a range of 0.63 to 0.8, and a ratio of a maximum diameter of the lens L2 to the overall length OAL is within a range of 0.51 to 0.79.

In at least some embodiments, the refractive index of the plastic aspheric lens L1 is within a range of 1.47 to 1.6, preferably of 1.49 to 1.6, and more preferably of 1.57 to 1.6. The material of a plastic aspheric lens may be PMMA or PC.

A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis to correct abbreviations. In the following embodiment of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + \ldots$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

TABLE 2

| Surface | K | A | B | C | D | E | F | G |
|---|---|---|---|---|---|---|---|---|
| S1* | −2.46 | 3.964E−05 | −3.357E−07 | 2.008E−09 | −6.854E−12 | 1.357E−14 | −1.424E−17 | 6.022E−21 |
| S2* | 49.26 | 2.633E−05 | −1.523E−07 | 6.340E−10 | −8.220E−13 | −1.681E−15 | 6.528E−18 | −5.900E−21 |

Figure 11:
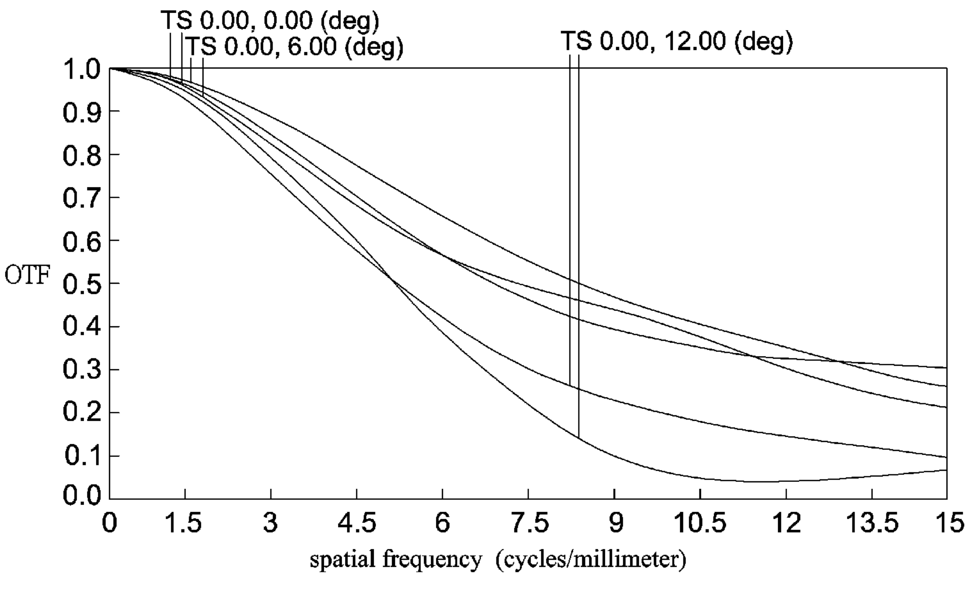
FIGS. 11 and 12 show optical simulation results of the vehicle projection lens shown in FIG. 2.
Figure 12:
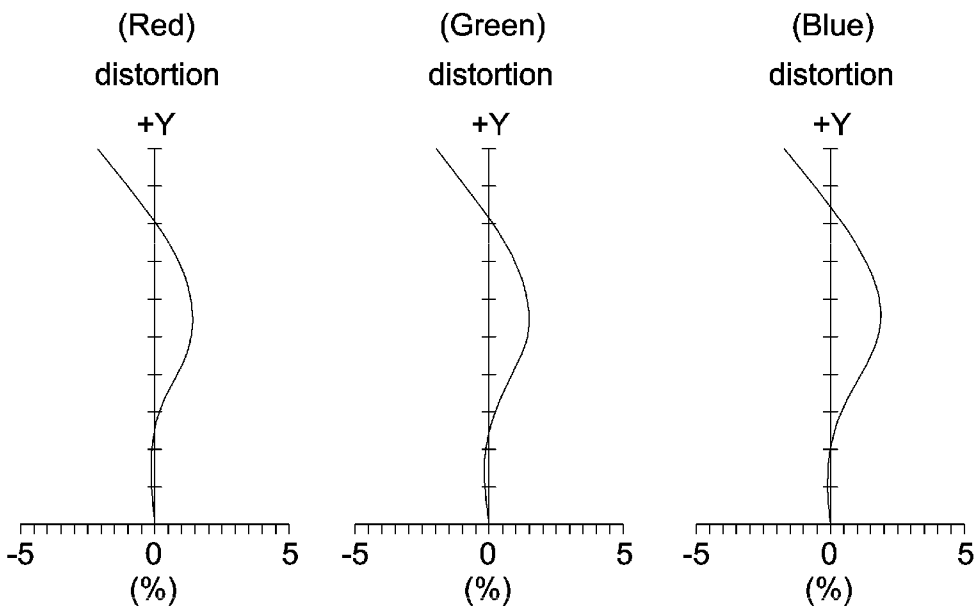

FIGS. 11 and 12 show optical simulation results of the vehicle projection lens 10*a* shown in FIG. 2. FIG. 11 is a modulation transfer function (MTF) diagram, where the horizontal axis is the spatial frequency in cycles per millimeter, and the vertical axis is the absolute value of the modulus of the optical transfer function (OTF). FIG. 12 illustrates percentage distortion curves for red, green and blue color lights. The simulated results shown in FIGS. 11 and 12 are within permitted ranges specified by the standard, which indicates the vehicle projection lens 10*a* according to the above embodiment may achieve good imaging quality.

Figure 3:
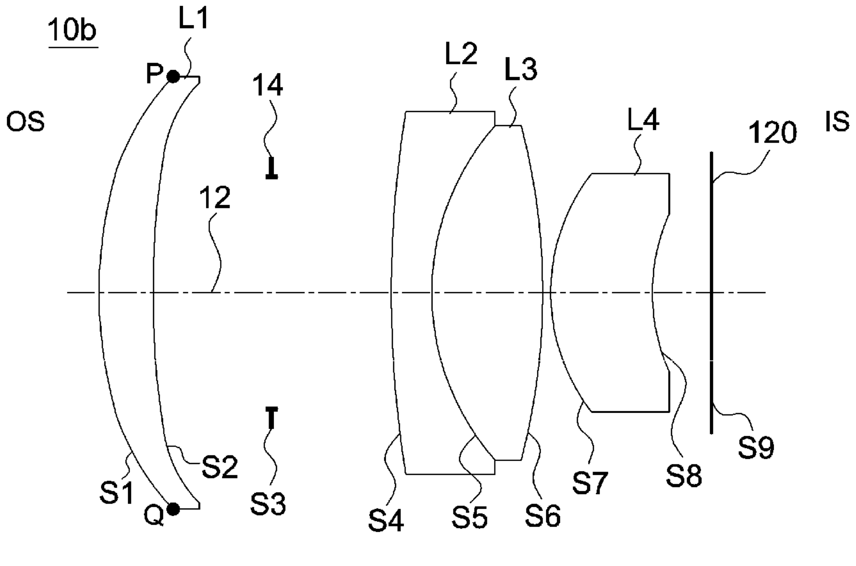
FIG. 3 shows a schematic cross-section of a vehicle projection lens in accordance with another embodiment of the invention.
Figure 4:
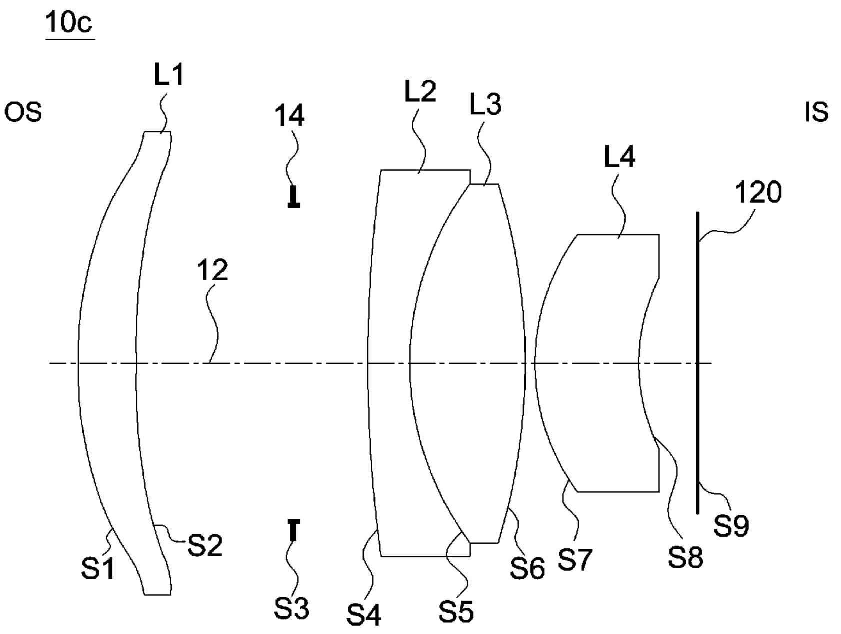
FIG. 4 shows a schematic cross-section of a vehicle projection lens in accordance with another embodiment of the invention.
Figure 5:
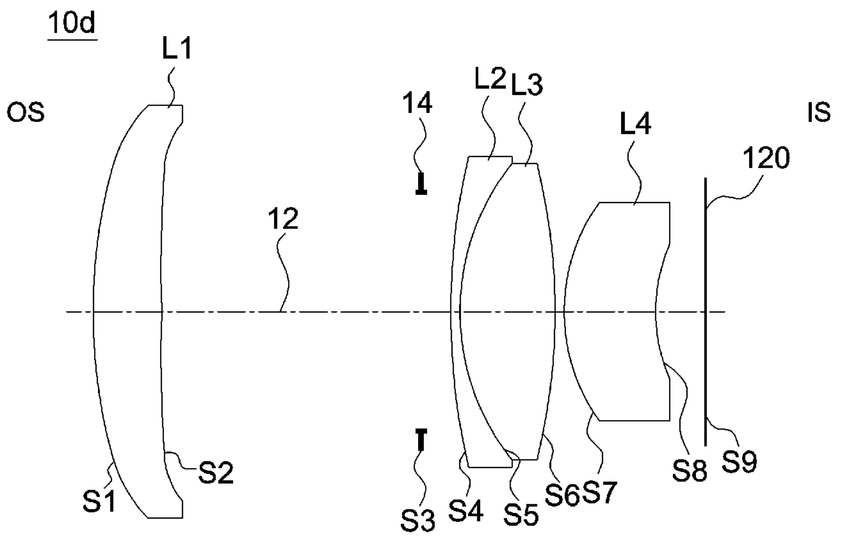
FIG. 5 shows a schematic cross-section of a vehicle projection lens in accordance with another embodiment of the invention.

FIGS. 3-5 respectively show schematic cross-sections of a vehicle projection lens 10*b*-10*d* in accordance with the second to fourth embodiments of the invention. In the second to fourth embodiments, the main differences as compared with the first embodiment lie in the values of radius of curvature, interval, refractive index, Abbe number, maximum lens diameter, aspheric coefficient and so on. In the second embodiment, the vehicle projection lens 10*b* has an FOV of about 24 degrees, an F-number of 0.68, an effective focal length EFL of 30.93 mm, |EFL/BFL|=4.5, and a maximum diameter 51.4 mm of the plastic aspheric lens L1. In the third embodiment, the vehicle projection lens 10*c* has an FOV of about 24 degrees, an F-number of 0.681, an effective focal length EFL of 30.9 mm, |EFL/BFL|=4.33, and a maximum diameter 51.4 mm of the plastic aspheric lens L1. In the fourth embodiment, the vehicle projection lens 10*d* has an FOV of about 24 degrees, an F-number of 0.691, an effective focal length EFL of 30.65 mm, |EFL/BFL|=4.58, and a maximum diameter 51.4 mm of the plastic aspheric lens L1. Detailed optical data and design parameters of the vehicle projection lenses 10*b*-10*d* are respectively shown in Tables 3, 5 and 7 below. The conic constants and aspheric coefficients of the vehicle projection lenses 10*b*-10*d* are respectively listed in Tables 4, 6 and 8 below.

TABLE 3

| Object description | Surface | Radius (mm) | Interval (mm) | Refractive index (Nd) | Abbe number (Vd) |
|---|---|---|---|---|---|
| lens L1(aspheric) | S1* | 46.74 | 7.23 | 1.4927 | 54.66 |
| | S2* | 212.21 | 17.56 | | |
| aperture stop 14 | S3 | INF | 11.81 | | |
| lens L2(meniscus) | S4 | 82.19 | 5.00 | 1.8467 | 23.79 |
| lens L3(bi-convex) | S5 | 26.03 | 14.00 | 1.7725 | 49.61 |
| | S6 | −53.39 | 0.25 | | |
| lens L4(meniscus) | S7 | 20.15 | 13.00 | 1.7725 | 49.61 |
| | S8 | 17.37 | 6.87 | | |
| image source 120 | S9 | | | | |

TABLE 4

| Surface | K | A | B | C | D | E | F | G |
|---|---|---|---|---|---|---|---|---|
| S1* | −3.119E+00 | 3.837E−05 | −3.515E−07 | 2.085E−09 | −6.781E−12 | 1.246E−14 | −1.195E−17 | 4.592E−21 |
| S2* | 8.805E+01 | 2.968E−05 | −2.575E−07 | 1.487E−09 | −4.143E−12 | 5.134E−15 | −5.937E−19 | −2.786E−21 |

TABLE 5

| Object description | Surface | Radius (mm) | Interval (mm) | Refractive index (Nd) | Abbe number (Vd) |
|---|---|---|---|---|---|
| lens L1(aspheric) | S1* | 43.45 | 7.10 | 1.4927 | 54.66 |
| | S2* | 155.28 | 19.07 | | |
| aperture stop 14 | S3 | INF | 9.43 | | |
| lens L2(meniscus) | S4 | 126.70 | 5.00 | 1.8467 | 23.79 |
| lens L3(bi-convex) | S5 | 25.81 | 14.00 | 1.7725 | 49.61 |
| | S6 | −51.92 | 0.25 | | |
| lens L4(meniscus) | S7 | 17.36 | 13.00 | 1.6968 | 55.53 |
| | S8 | 16.11 | 7.13 | | |
| image source 120 | S9 | | | | |

TABLE 6

| Surface | K | A | B | C | D | E | F | G |
|---|---|---|---|---|---|---|---|---|
| S1* | −3.44 | 7.592E−05 | −7.139E−07 | 4.123E−09 | −1.393E−11 | 2.755E−14 | −2.971E−17 | 1.333E−20 |
| S2* | 43.43 | 6.517E−05 | −6.214E−07 | 3.465E−09 | −1.096E−11 | 1.976E−14 | −1.911E−17 | 7.530E−21 |

TABLE 7

| Object description | Surface | radius (mm) | Interval (mm) | Refractive index (Nd) | Abbe number (Vd) |
|---|---|---|---|---|---|
| lens L1(aspheric) | S1* | 73.40 | 8.94 | 1.4927 | 54.66 |
| | S2* | −290.97 | 33.84 | | |
| aperture stop 14 | S3 | INF | 4.16 | | |
| lens L2(meniscus) | S4 | 65.88 | 1.00 | 1.8467 | 23.79 |
| lens L3(bi-convex) | S5 | 23.83 | 12.76 | 1.7725 | 49.61 |
| | S6 | −54.78 | 0.25 | | |
| lens L4(meniscus) | S7 | 18.50 | 11.85 | 1.7725 | 49.61 |
| | S8 | 15.62 | 6.70 | | |
| image source 120 | S9 | | | | |

TABLE 8

| Surface | K | A | B | C | D | E | F | G |
|---|---|---|---|---|---|---|---|---|
| S1* | −2.32 | 3.147E−05 | −3.152E−07 | 2.031E−09 | −7.260E−12 | 1.474E−14 | −1.584E−17 | 7.077E−21 |
| S2* | −33.36 | 2.952E−05 | −3.240E−07 | 2.659E−09 | −1.188E−11 | 3.002E−14 | −4.015E−17 | 2.246E−20 |

Figure 6:
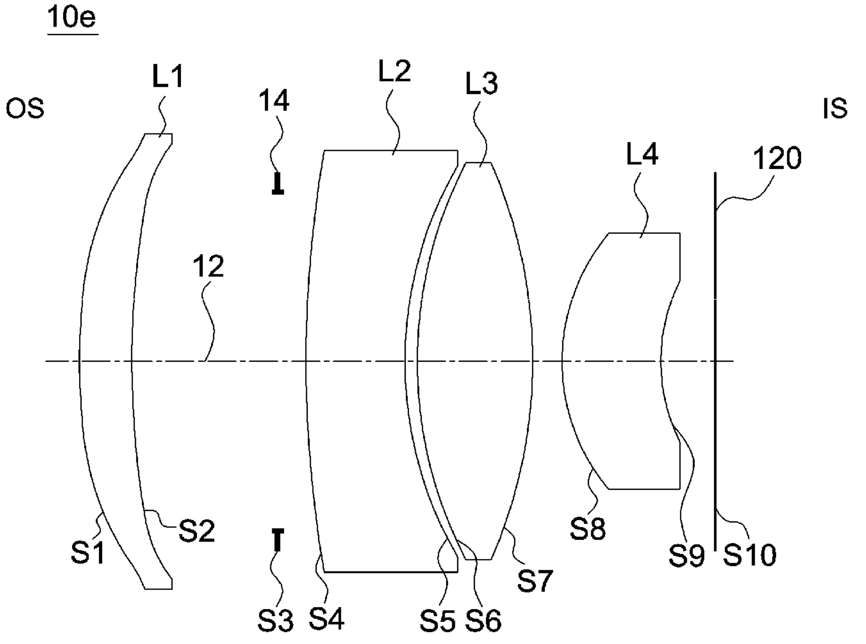
FIG. 6 shows a schematic cross-section of a vehicle projection lens in accordance with another embodiment of the invention.
Figure 7:
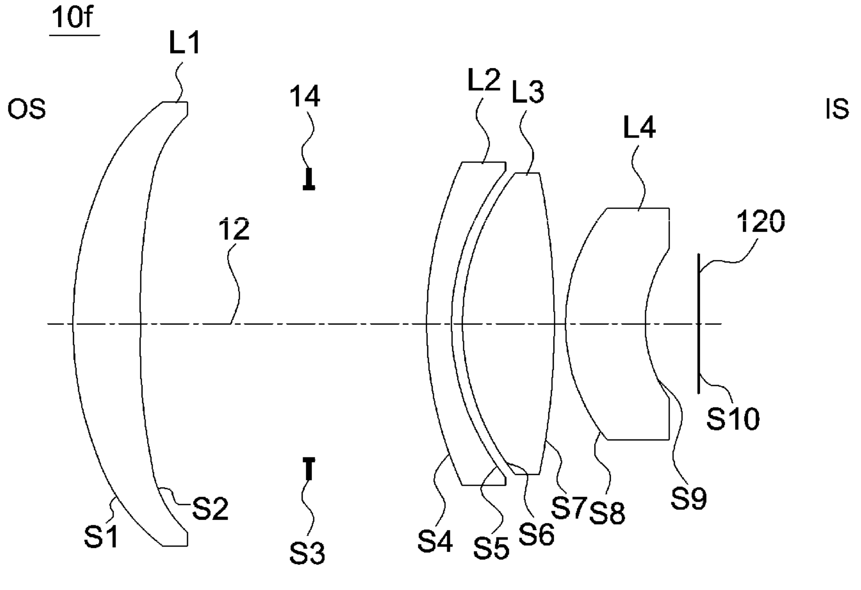
FIG. 7 shows a schematic cross-section of a vehicle projection lens in accordance with another embodiment of the invention.

FIGS. 6-7 respectively show schematic cross-sections of a vehicle projection lens 10*e* and 10*f* in accordance with the fifth and sixth embodiments of the invention. In the fifth and sixth embodiments, the main differences as compared with the first embodiment lie in that the vehicle projection lens 10*e* and 10*f* do not have a cemented lens, and that the values of radius of curvature, interval, refractive index, Abbe number, maximum lens diameter, aspheric coefficient are different. In the fifth embodiment, the vehicle projection lens 10*e* has an FOV of about 24 degrees, an F-number of 0.688, an effective focal length EFL of 31.42 mm, |EFL/BFL|=4.71, and a maximum diameter 50.68 mm of the plastic aspheric lens L1. In the sixth embodiment, the vehicle projection lens 10*f* has an FOV of about 24 degrees, an F-number of 0.688, an effective focal length EFL of 31.33 mm, |EFL/BFL|=5.05, and a maximum diameter 52.59 mm of the plastic aspheric lens L1. Detailed optical data and design parameters of the vehicle projection lenses 10*e* and 10*f* are respectively shown in Tables 9 and 11 below. The conic constants and aspheric coefficients of the vehicle projection lenses 10*e* and 10*f* are respectively listed in Tables 10 and 12 below.

TABLE 9

| Object description | Surface | radius (mm) | Interval (mm) | Refractive index (Nd) | Abbe number (Vd) |
|---|---|---|---|---|---|
| lens L1(aspheric) | S1* | 43.76 | 6.44 | 1.493 | 54.66 |
| | S2* | 161.12 | 17.82 | | |
| aperture stop 14 | S3 | INF | 3.65 | | |
| lens L2(meniscus) | S4 | 115.69 | 12.00 | 1.847 | 23.79 |
| | S5 | 34.34 | 0.63 | | |
| lens L3(bi-convex) | S6 | 36.49 | 13.91 | 1.729 | 54.67 |
| | S7 | −42.71 | 3.75 | | |
| lens L4(meniscus) | S8 | 18.26 | 12.00 | 1.800 | 42.25 |
| | S9 | 15.19 | 6.67 | | |
| image source 120 | S10 | | | | |

TABLE 10

| Surface | K | A | B | C | D | E | F | G |
|---|---|---|---|---|---|---|---|---|
| S1* | −9.15 | 4.063E−05 | −3.354E−07 | 2.005E−09 | −6.849E−12 | 1.358E−14 | −1.425E−17 | 5.931E−21 |
| S2* | 49.30 | 1.818E−05 | −1.394E−07 | 6.413E−10 | −8.376E−13 | −1.718E−15 | 6.500E−18 | −5.836E−21 |

TABLE 11

| Object description | Surface | radius(mm) | Interval (mm) | Refractive index (Nd) | Abbe number (Vd) |
|---|---|---|---|---|---|
| lens Ll(aspheric) | S1* | 42.43 | 8.28 | 1.493 | 54.66 |
| | S2* | 167.92 | 20.26 | | |
| aperture stop 14 | S3 | INF | 14.46 | | |
| lens L2(meniscus) | S4 | 38.23 | 3.00 | 1.847 | 23.79 |
| | S5 | 23.08 | 0.77 | | |
| lens L3(bi-convex) | S6 | 24.67 | 11.26 | 1.729 | 54.67 |
| | S7 | −62.09 | 0.25 | | |
| lens L4(meniscus) | S8 | 17.73 | 9.96 | 1.847 | 23.79 |
| | S9 | 12.67 | 6.20 | | |
| image source 120 | S10 | | | | |

TABLE 12

| Surface | K | A | B | C | D | E | F | G |
|---|---|---|---|---|---|---|---|---|
| S1* | −9.66 | 4.407E−05 | −3.356E−07 | 1.999E−09 | −6.855E−12 | 1.358E−14 | −1.421E−17 | 6.035E−21 |
| S2* | 52.81 | 1.847E−05 | −1.338E−07 | 6.310E−10 | −8.556E−13 | −1.718E−15 | 6.553E−18 | −5.636E−21 |

Figure 8:
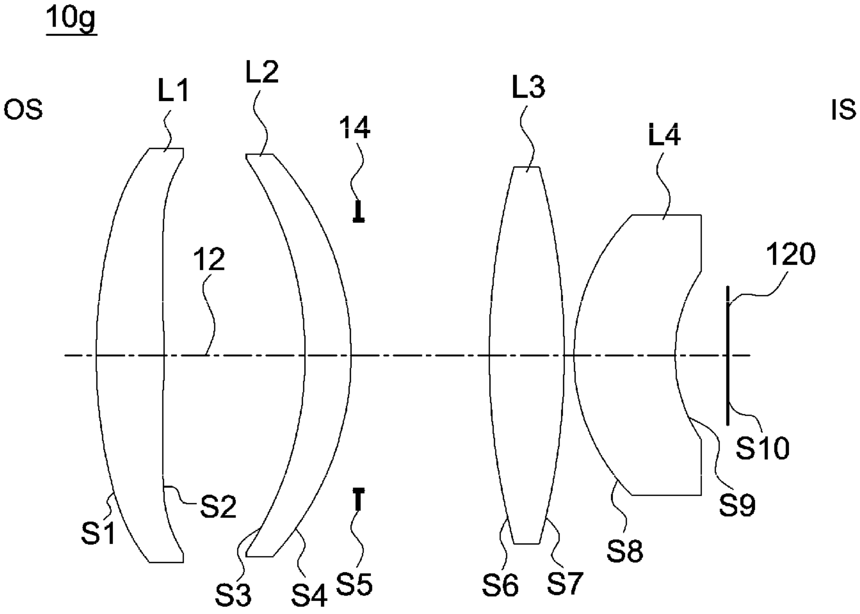
FIG. 8 shows a schematic cross-section of a vehicle projection lens in accordance with another embodiment of the invention.

FIG. 8 shows a schematic cross-section of a vehicle projection lens 10*g* in accordance with the seventh embodiment of the invention. In this embodiment, the main differences as compared with the first embodiment lie in that the vehicle projection lens 10*g* does not have a cemented lens, and that the values of radius of curvature, interval, refractive index, Abbe number, maximum lens diameter, aspheric coefficient are different. In this embodiment, the vehicle projection lens 10*g* has an FOV of about 24 degrees, an F-number of 0.67, an effective focal length EFL of 31.07 mm, |EFL/BFL|=5.01, and a maximum diameter 49.02 mm of the plastic aspheric lens L1. Detailed optical data and design parameters of the vehicle projection lens 10*g* is shown in Table 13 below. The conic constants and aspheric coefficients of the vehicle projection lens 10*g* is listed in Table 14 below.

TABLE 13

| Object description | Surface | radius (mm) | Interval (mm) | Refractive index (Nd) | Abbe number (Vd) |
|---|---|---|---|---|---|
| lens L1(aspheric) | S1* | 62.49 | 7.85 | 1.493 | 54.66 |
| | S2* | −206.06 | 16.73 | | |
| lens L2(meniscus) | S3 | −35.52 | 5.19 | 1.497 | 81.6128 |
| | S4 | −30.34 | 0.25 | | |
| aperture stop 14 | S5 | INF | 15.69 | | |
| lens L3(bi-convex) | S6 | 78.05 | 8.76 | 1.729 | 54.67 |
| | S7 | −66.28 | 0.25 | | |
| lens L4(meniscus | S8 | 19.03 | 12.00 | 1.729 | 54.67 |
| | S9 | 14.47 | 6.20 | | |
| image source 120 | S10 | | | | |

TABLE 14

| Surface | K | A | B | C | D | E | F | G |
|---|---|---|---|---|---|---|---|---|
| S1* | −39.20 | 4.130E−05 | −3.368E−07 | 2.003E−09 | −6.844E−12 | 1.359E−14 | −1.424E−17 | 5.927E−21 |
| S2* | 15.33 | 1.968E−05 | −1.320E−07 | 6.447E−10 | −8.382E−13 | −1.709E−15 | 6.533E−18 | −5.775E−21 |

Figure 9:
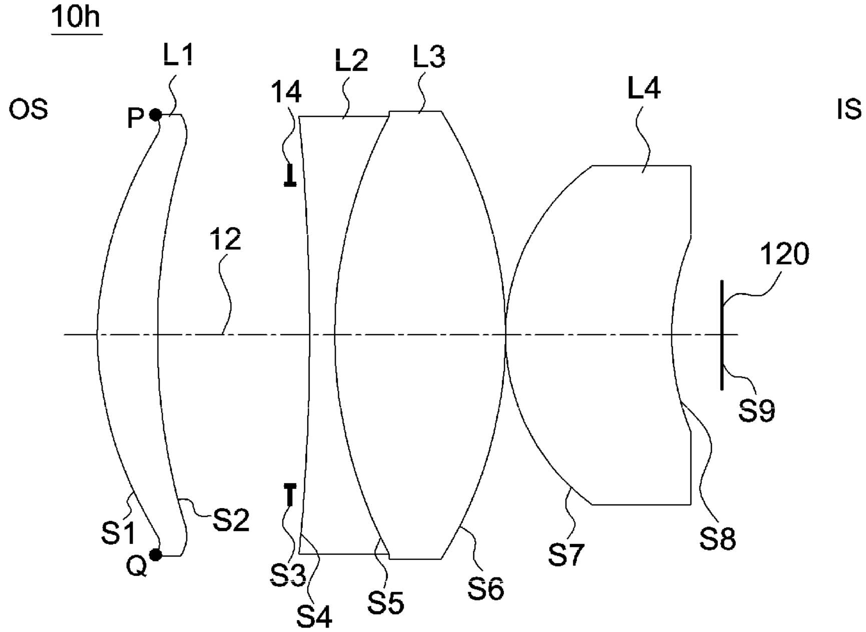
FIG. 9 shows a schematic cross-section of a vehicle projection lens in accordance with another embodiment of the invention.
Figure 10:
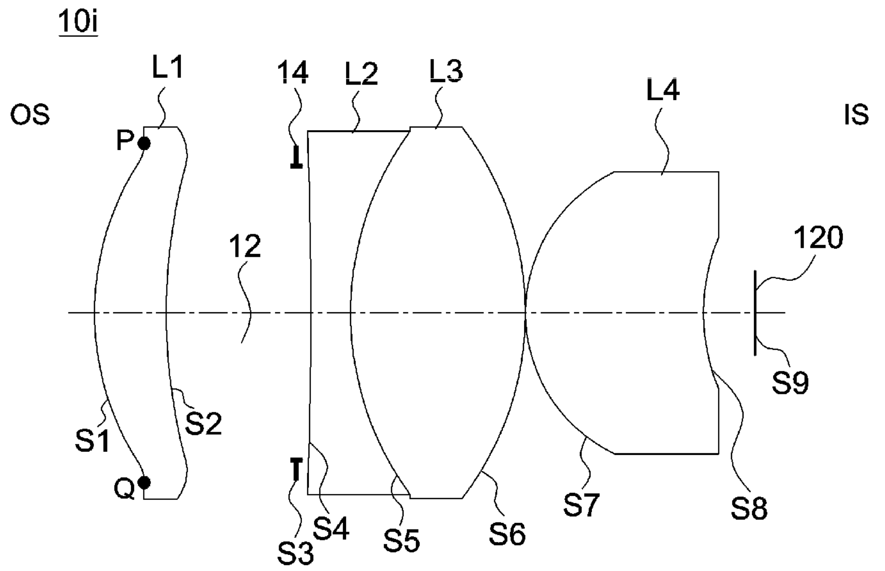
FIG. 10 shows a schematic cross-section of a vehicle projection lens in accordance with another embodiment of the invention.

FIGS. 9 and 10 respectively show schematic cross-sections of a vehicle projection lens 10*h* and 10*i* in accordance with the eighth and ninth embodiments of the invention. In the eighth and ninth embodiments, the main differences as compared with the first embodiment lie in that the maximum diameter of the lens L3 is greater than the maximum diameter of the lens L1, and that the values of radius of curvature, interval, refractive index, Abbe number, maximum lens diameter, aspheric coefficient are different. In the eighth embodiment, the vehicle projection lens 10*h* has an FOV of about 24 degrees, an F-number of 0.597, an effective focal length EFL of 28.3 mm, |EFL/BFL|=4.84, and a maximum diameter 52.6 mm of the plastic aspheric lens L1. In the ninth embodiment, the vehicle projection lens 10*i* has an FOV of about 24 degrees, an F-number of 0.594, an effective focal length EFL of 28.3 mm, [EFL/BFL]=4.86, and a maximum diameter 51.6 mm of the plastic aspheric lens L1. Detailed optical data and design parameters of the vehicle projection lenses 10*h* and 10*i* are respectively shown in Tables 15 and 17 below. The conic constants and aspheric coefficients of the vehicle projection lenses 10*h* and 10*i* are respectively listed in Tables 16 and 18 below.

TABLE 15

| Object description | Surface | radius (mm) | Interval (mm) | Refractive index (Nd) | Abbe number (Vd) |
|---|---|---|---|---|---|
| lens L1(aspheric) | S1* | 34.84 | 7.430 | 1.4916 | 57.85 |
| | S2* | 157.59 | 15.635 | | |
| aperture stop 14 | S3 | INF | 2.144 | | |
| lens L2(bi-concave) | S4 | −241.48 | 3.293 | 1.8467 | 23.78 |
| lens L3(bi-convex) | S5 | 48.68 | 20.000 | 1.7130 | 53.87 |
| | S6 | −43.08 | 0.100 | | |
| lens L4(meniscus) | S7 | 21.55 | 20.000 | 1.7725 | 49.60 |
| | S8 | 30.03 | 5.845 | | |
| image source 120 | S9 | | | | |

TABLE 16

| Surface | K | A | B | C | D | E | F | G |
|---|---|---|---|---|---|---|---|---|
| S1* | −4.711E+01 | 8.513E−05 | −4.963E−07 | 1.976E−09 | −4.570E−12 | 5.652E−15 | −3.031E−18 | −4.711E+01 |
| S2* | −9.900E+01 | 1.700E−05 | −6.026E−08 | 2.563E−10 | −3.973E−13 | 4.214E−17 | 1.318E−19 | −9.900E+01 |

TABLE 17

| Object description | Surface | radius (mm) | Interval (mm) | Refractive index (Nd) | Abbe number (Vd) |
|---|---|---|---|---|---|
| lens L1(aspheric) | S1* | 33.48 | 8.52 | 1.4954 | 57.67 |
| | S2* | 105.14 | 14.47 | | |
| aperture stop 14 | S3 | INF | 1.69 | | |
| lens L2(bi-concave) | S4 | −580.10 | 4.40 | 1.8467 | 23.79 |
| lens L3(bi-convex) | S5 | 45.14 | 20.00 | 1.713 | 53.83 |
| | S6 | −45.14 | 0.10 | | |
| lens L4(meniscus) | S7 | 21.73 | 20.00 | 1.7725 | 49.61 |
| | S8 | 30.31 | 5.82 | | |
| image source 120 | S9 | | | | |

TABLE 18

| Surface | K | A | B | C | D | E | F | G |
|---|---|---|---|---|---|---|---|---|
| S1* | −3.996E+01 | 8.504E−05 | −5.302E−07 | 2.146E−09 | −5.015E−12 | 5.726E−15 | −1.913E−18 | −1.004E−21 |
| S2* | 1.544E+01 | 8.984E−06 | −8.404E−08 | 4.774E−10 | −1.496E−12 | 2.219E−15 | −1.487E−18 | 2.541E−22 |

Figure 13:
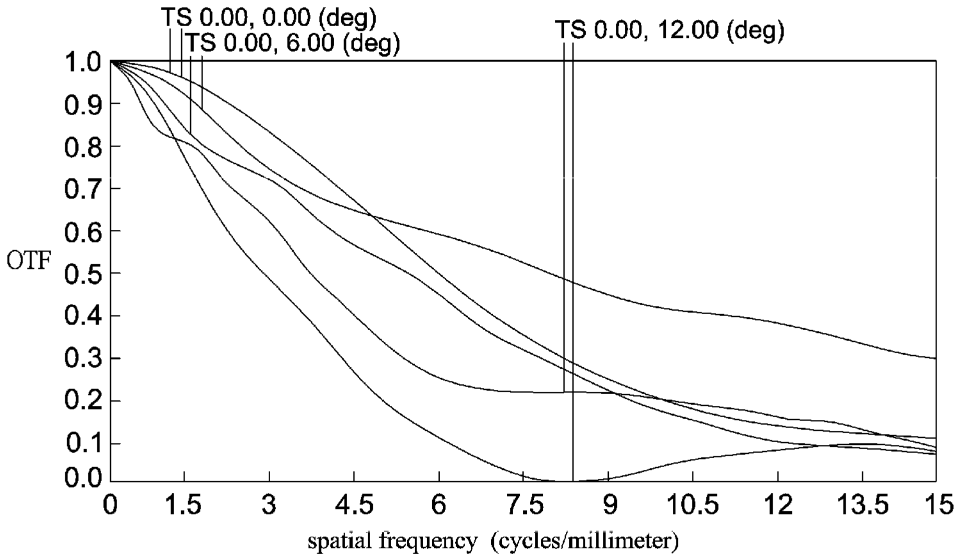
FIGS. 13 and 14 show optical simulation results of the vehicle projection lens shown in FIG. 9.
Figure 14:
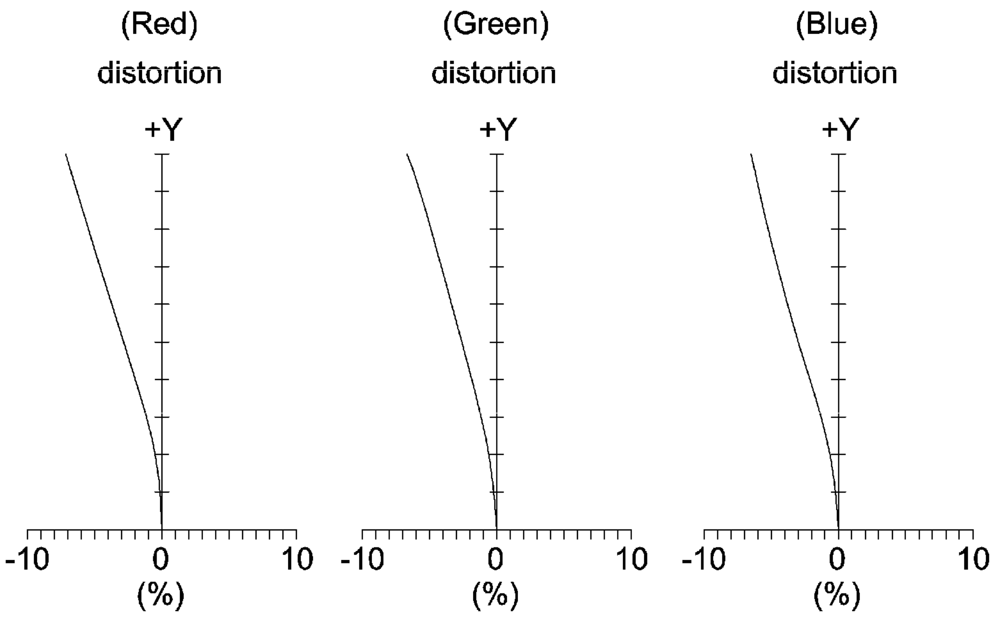

FIGS. 13 and 14 show optical simulation results of the vehicle projection lens 10*h* shown in FIG. 9. FIG. 13 is a modulation transfer function (MTF) diagram, where the horizontal axis is the spatial frequency in cycles per millimeter, and the vertical axis is the absolute value of the modulus of the optical transfer function (OTF). FIG. 14 illustrates percentage distortion curves for red, green and blue color lights. The simulated results shown in FIGS. 13 and 14 are within permitted ranges specified by the standard, which indicates the vehicle projection lens 10*h* according to the above embodiment may achieve good imaging quality.

According to at least some embodiments, the lens L1 is a plastic aspheric lens and the lens L2, lens L3 and lens L4 are glass spherical lens to make a compromise between low fabrication costs and high imaging qualities. In addition, by making the vehicle projection lens essentially consist of four lenses, the purpose of lowering manufacturing costs can also be achieved. Moreover, in one embodiment, the lens closest to the minified side is a glass lens to allow for a wide range of operating temperature. According to the above embodiments, the vehicle projection lens and vehicle lamp may comply with government regulations specifying safety requirements for vehicle lighting and may have high resolution, low distortion, miniaturized assembly, and can be used with vehicle headlight products to have reduced fabrication costs and good imaging quality.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A vehicle projection lens, comprising in order along a direction:

a first lens being an aspheric lens;

a second lens having a negative refractive power;

a third lens having a refractive power; and a fourth lens having a positive refractive power and being closest to a minified side of the vehicle projection lens among all lenses of the vehicle projection lens, wherein an F-number of the vehicle projection lens is smaller than or equal to 0.86, a field of view of the vehicle projection lens is greater than 14 degrees and smaller than 44 degrees, the vehicle projection lens consists essentially of four lenses, the first lens has a greatest diameter among all lenses of the vehicle projection lens, and the vehicle projection lens satisfies a condition of |EFL/BFL|>3.8, where EFL is an effective focal length of the vehicle projection lens, and BFL is a back focal length of the vehicle projection lens.

2. The vehicle projection lens as claimed in claim 1, wherein an aperture stop is disposed between a magnified side of the vehicle projection lens and the third lens.

3. The vehicle projection lens as claimed in claim 1, wherein a magnified-side surface of the first lens has a positive radius of curvature.

4. The vehicle projection lens as claimed in claim 1, wherein the four lenses are an aspheric lens, a meniscus lens, a bi-convex lens and a meniscus lens in order from a magnified side to the minified side.

5. The vehicle projection lens as claimed in claim 1, wherein the four lenses respectively have positive, negative, positive and positive refractive powers from a magnified side to the minified side.

6. The vehicle projection lens as claimed in claim 1, wherein an interval between the first lens and the second lens is within a range of 15 mm to 40 mm.

7. The vehicle projection lens as claimed in claim 1, wherein a ratio of a maximum diameter of the first lens to an overall length of the vehicle projection lens is within a range of 0.63 to 0.8.

8. The vehicle projection lens as claimed in claim 1, wherein the aspheric lens is made from plastic.

9. The vehicle projection lens as claimed in claim 1, wherein the vehicle projection lens further comprises a prism or a reflective mirror disposed on the minified side.

10. The vehicle projection lens as claimed in claim 1, wherein the vehicle projection lens has an F-number within a range of 0.4 to 0.86.

11. The vehicle projection lens as claimed in claim 1, wherein a total track length of the vehicle projection lens is smaller than 90 mm.

12. The vehicle projection lens as claimed in claim 1, wherein the four lenses are an aspheric lens, a bi-concave lens, a bi-convex lens and a meniscus lens in order from a magnified side to the minified side.

13. The vehicle projection lens as claimed in claim 1, wherein a ratio of an interval between the first lens and the second lens to an overall length of the vehicle projection lens is within a range of 0.22 to 0.56.

14. The vehicle projection lens as claimed in claim 1, wherein a ratio of a maximum diameter of the second lens to an overall length of the vehicle projection lens is within a range of 0.51 to 0.79.

15. The vehicle projection lens as claimed in claim 1, wherein the vehicle projection lens comprises both glass and plastic materials.

16. The vehicle projection lens as claimed in claim 1, wherein the vehicle projection lens includes a cemented lens.

17. The vehicle projection lens as claimed in claim 1, wherein the second lens and the third lens form a cemented doublet.

18. The vehicle projection lens as claimed in claim 1, wherein each of the second lens, the third lens and the fourth lens is a spherical lens.

19. A vehicle projection lens consisting essentially of, in order from a magnified side to a minified side:

a first lens being an aspheric lens;

a second lens having a negative refractive power;

a third lens having a refractive power; and a fourth lens having a positive refractive power and being closest to a minified side of the vehicle projection lens among all lenses of the vehicle projection lens, wherein an F-number of the vehicle projection lens is smaller than or equal to 0.86, a field of view of the vehicle projection lens is greater than 14 degrees and smaller than 44 degrees, the vehicle projection lens consists essentially of four lenses, the first lens has a greatest diameter among all lenses of the vehicle projection lens, and the vehicle projection lens satisfies a condition of $|EFL/BFL|>3.8$, where EFL is an effective focal length of the vehicle projection lens, and BFL is a back focal length of the vehicle projection lens.

* * * * *